(12) United States Patent
Modlin

(10) Patent No.: US 7,239,664 B2
(45) Date of Patent: Jul. 3, 2007

(54) METHOD FOR SELECTING THE DATA RATE FOR PCM UPSTREAM TRANSMISSION

(75) Inventor: Cory Samuel Modlin, Chevy Chase, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/296,789

(22) Filed: Dec. 7, 2005

(65) Prior Publication Data

US 2006/0083318 A1    Apr. 20, 2006

Related U.S. Application Data

(62) Division of application No. 10/120,507, filed on Apr. 12, 2002, now Pat. No. 7,023,927.

(51) Int. Cl.
    *H04B 14/04*  (2006.01)
(52) U.S. Cl. .......................... 375/242; 375/295
(58) Field of Classification Search ................ 375/242, 375/295, 241; 455/522, 69; 332/106; 370/205
    See application file for complete search history.

(56) References Cited

U.S. PATENT DOCUMENTS

| 4,937,844 A | 6/1990 | Kao |
| 5,862,184 A | 1/1999 | Goldstein et al. |
| 5,950,124 A * | 9/1999 | Trompower et al. ...... 455/422.1 |
| 5,986,596 A | 11/1999 | Waldron |
| 6,173,015 B1 | 1/2001 | Eyuboglu et al. |
| 6,181,752 B1 | 1/2001 | Kim |
| 6,198,776 B1 | 3/2001 | Eyuboglu et al. |
| 6,201,836 B1 | 3/2001 | Kim |
| 6,266,376 B1 | 7/2001 | Pilozzi et al. |
| 6,542,551 B1 | 4/2003 | Okunev et al. |
| 6,577,683 B1 | 6/2003 | Waldron et al. |
| 6,665,336 B2 * | 12/2003 | Abdelilah et al. .......... 375/225 |
| 2001/0000705 A1 * | 5/2001 | Olafsson ..................... 375/295 |

FOREIGN PATENT DOCUMENTS

| GB | 2358323 A | 7/2001 |
| WO | WO 99 34566 A | 7/1999 |

\* cited by examiner

*Primary Examiner*—Temesghen Ghebretinsae
(74) *Attorney, Agent, or Firm*—Steven A. Shaw; W. James Brady; Frederick J. Telecky, Jr.

(57) ABSTRACT

A method selects the data rate for pulse code modulation upstream transmission by determining an approximate transmit power before the upstream transmission reaches a transmit equalizer based on a recorder power output and a distance halfway between an outermost constellation point and a point following the outermost point. The determined approximate transmit power is multiplied by the power of the transmit equalizer to determine a post-equalizer transmit value. A data rate is selected which is less than a predetermined regulatory limit.

3 Claims, 3 Drawing Sheets

METHOD FOR SELECTING THE DATA RATE FOR PCM UPSTREAM TRANSMISSION

CROSS-REFERENCE TO RELATED APPLICATIONS

This application is a Divisional and claim benefit under 35 U.S.C. Section 121 to U.S. Ser. No. 10/120,507 filed on Apr. 12, 2002, now U.S. Pat. No. 7,023,927 issued on Apr. 4, 2006.

FIELD OF THE INVENTION

A method for constellation design in a telecommunications network using pulse code modulation to transmit data signals upstream between client and server voice-band modems.

BACKGROUND OF THE INVENTION

Personal computers connecting to networks through the public switched telephone system (PSTN) typically use a modem to dial-up a network connection through analog telephone lines. These client, or end user, modems transmit data signals converted to digital source through an analog channel through a network. Due to the increase in data, voice, and facsimile traffic over the telecommunications infrastructure, methods to increase the digital and analog transfer rates through modems over telephone lines are extremely useful and necessary to adhere to International Telecommunication Union (ITU) standards.

The Telecommunication Standardization Sector of the ITU (ITU-T) adopted V.34 Recommendation in 1994, which is incorporated herein, to define modem operating speeds rom 28.8 kilobyte per second (kbps) up to 33.6 kbps. However, data transfer rates are limited over the PSTN. In modems built to V.34 standards of the International Telecommunications Union (ITU), and all previous voice-band modem standards, carrier-modulated quadrature amplitude modulation (QAM) is used to quantize the analog signals using u-law (or A-law for some standards outside of the U.S.) pulse code modulation (PCM) codecs. In such a system, the carrier frequency and symbol rate are chosen to match the channel, not the codec. However, in many cases there is a direct digital connection upstream of the analog client modem between a central office (CO) of the PSTN and a server modem on a digital network. PCM modems are built to take advantage of networks used by internet service providers or others connected to the PSTN through a digital connection, such as T1 in the United States and E1 in Europe. PCM modems use either standards for "PCM downstream" modulation, as described in ITU V.90, or "PCM upstream, as described in ITU V.92 recommendations. A connection between a client modem on a local loop of the PSTN and a connection on the digital network can be referred to as a "PCM channel".

In PCM downstream, data is transmitted in PCM mode downstream from a central office to an end user's analog modem, i.e. from server to client. The upstream digital PCM modem transmits over a digital network in eight bit digital words called octets that correspond to different central office codec output levels. At the client modem's central office, the octets are converted to analog levels which are transmitted over an analog loop. The client PCM modem then converts the analog levels back to digital signals, or pulse code amplitude (PAM) signals, and into equalized digital levels. The equalized digital levels are ideally mapped back into the originally transmitted octets that the octets represent When using PCM downstream modulation, the client modem synchronizes to the central office codec and tries to determine exactly which PCM sample was transmitted in each sample. In codecs throughout the world, the codec clock is 8000 Hz. Since there are 255 different µ-law levels and 256 different A-law levels, the data rates could go as high as nearly 64 kbps (8 bits/sample at 8000 samples/second). Practically, because the smallest levels are often too small to distinguish and because of regulatory power limits on the transmit signal, the highest data rate is listed as 56 kbps although even that is usually higher than what most channels will support. In PCM downstream, the client modem must implement an equalizer to undo the effects of intersymbol interference caused by the channel (the telephone line plus the analog front-end of the codec and client modems) in order to recover the PCM levels.

In PCM upstream modulation, the client modem transmits analog levels corresponding to data to be transmitted to the digital server modem over an analog telecommunications line. The analog levels are modified by the channel characteristics of the analog line. The modified levels are quantized to form octets by a codec in the central office. In PCM upstream, the channel comes before the codec, further limiting the highest possible data rate. The codec then transmits the octets to the PCM server modem over the digital network. At the server modem, the transmitted levels are demodulated from the octets, thereby recovering the data sent from the client modem.

If the client modem were simply to transmit PCM levels, the channel would distort the levels so that when it reached the codec, they would not resemble the transmitted levels at all. The server modem is not able to equalize the receive signals until after the codec and therefore can not limit the effect of quantization noise. In order to take advantage of the PCM codec in the upstream direction, the client modem must implement an equalizer in the transmitter to undo the effects of intersymbol interference.

There are a number of factors that limit the PCM upstream data rate more than the PCM downstream data rate and provide additional challenges. Regulatory limits on the client modem transmit power mean that the higher the upstream channel attenuation, the lower the upstream data rate. In the downstream direction, only the signal-to-noise ratio (SNR) limits downstream performance. The echo from the downstream signal is added before the codec. Even a perfect echo canceller in the server modem can not remove the quantization noise caused by the echo. The equalizer in the client transmitter can not continually adapt to changing channel conditions as can the receive equalizer used for PCM downstream. The only way to adapt the transmit equalizer is for the server to notify the client through a rate renegotiation. The timing recovery in the upstream direction is more difficult that in the downstream direction. Due to these and other problems in PCM upstream transmissions, the levels transmitted by the client PCM modem are modified. Since these modified levels are quantized to form octets by the codec, and not the levels that are actually transmitted, it can be difficult for the server modem to accurately determine from the octets the data being transmitted by the client modem.

In general, signal constellations consist of complex-valued signal points which lie on an N-dimensional grid. User data is encoded into constellation points. One constellation point is transmitted during each symbol period. The higher the symbol rate and the more constellation points, the higher the data rate.

Codes are often used to prevent certain sequences of constellation points to reduce the likelihood of decoder errors. Recommendation V.92 states that the convolutional encoders from Recommendation V.34 shall be used for V.92. ITU-T Recommendation V.34 are standards for a modem operating at data signaling rates of up to 33,600 bits/s for use on the general switched telephone network and on leased point-to-point 2-wire telephone type circuits. The conventional approach to selecting the signal points of a PCM-derived constellation would be to choose ones of the quantization levels that are equally spaced and for levels for which the minimum distance between the levels is large enough to ensure reliable operation. The minimum distance criterion, in particular, is a critical design parameter because the transmitted signal points, when they traverse a local analog line, are inevitably displaced in signal space by channel noise and other channel impairments. Thus, the extent to which a transmitted signal may be erroneously detected at a receiving modem depends on the distance between the transmitted signal point and its nearest neighbor points in the PCM-derived constellation. Such a scheme will achieve a certain expected level of error rate performance, which many be adequate for particular applications. If a higher level of error rate performance is required, it is well known for voice-band modem transmissions to apply channel coding methods such as trellis coded modulation to an existing scheme to achieve an effective minimum distance between the signal points that allows for higher transfer rates with an equivalent level of performance. However, additional coding adds implementational complexity and transmission delays to system.

The standard may use trellis coding for all data signaling rates. Trellis encoding is a method for improving noise immunity using a convolutional coder to select a sequence of subsets in a partitioned signal constellation. The trellis encoders used in the ITU recommendation are used in a feedback structure where the inputs to the trellis encoder are derived from the signal points. Trellis coded modulation (TCM) is one of the coding standards recommended under the V.92 modem communications standard. Trellis codes using lattices of dimensions larger than two have been constructed and have several advantages. One dimensional (1D) symbols are grouped to form four-dimensional (4D) symbol intervals. Multidimensional trellis code signals as a basis for signal constellations are a theoretical concept, since, in practice, multidimensional signals are transmitted as sequences of one or two dimensional signals. Doubling the constellation size while maintaining constant energy reduces the minimum distance within the constellation, and this reduction has to be compensated for by the code before any coding gain can be achieved.

The decoding operation comprises finding the correct path through the trellis that most closely represents the received binary sequence. The decoder finds a path for the received binary sequence that has the minimum distance from the received sequence. The iterative procedure accomplishing the decoding is the Viterbi algorithm. The algorithm uses forward dynamic programming to select the best, or minimum distance, path through a trellis. At each node, in the trellis, the only path retained is the best path, therefore limiting the number of retained paths at any time instant to the total number of trellis nodes at that time.

The ability to design an appropriate transmission constellation plays a critical role in producing high quality modem transmissions in PCM upstream. The signal points of the PCM-derived signal constellation comprise points selected from PCM quantization levels, which eliminates PCM quantization noise as a source of noise in the overall system. What gets transmitted is the quantization level that is closest to the actual signal amplitude, for example an 8-bit word which represents that level. The discrepancy between the actual amplitude and the transmitted representation of that amplitude appears in the receiving modem as quantization noise. The PCM-derived signal constellation can be a u-law or A-law quantization that uses 255 or 256 quantization levels.

SUMMARY

The invention relates to a method and device for providing pulse code modulation (PCM) data transmission for networks, such a network implementing PCM upstream voice-band modem transmissions. More specifically, the invention is a method for constellation design in a telecommunications network using pulse code modulation to transmit data signals upstream between client and server voice-band modems. The results of the constellation design assists in optimization of upstream data rate rates for data transmissions in a network under V.92 standards between a client modem a server modem. The method selects a constellation for transmission over an analog channel of an equivalence class of data points using pulse code modulation based on the presence or absence of robbed bit signaling and interference from echo levels.

The constellation design is based on a conservative estimate of the additive noise level. The design is performed offline using different echo levels, different codecs, and the presence or absence of robbed bit signaling. Because echo is not exactly Gaussian, a cumulative distribution function is developed for the echo that is developed using a simulation with a typical measured hybrid and an actual V.90 downstream sequence. Other sources of noise are assumed as Gaussian. The extent of noise for an array of possible constellation points is then determined using simulations. Possible values for echo and noise are found and added to a selected constellation point, the result quantized, and the echo subtracted. The result for worst cases of positive and negative noise is tracked and saved. After these values are determined, points in a constellation are selected such that the consecutive point in an array is selected so that it's largest negative noise does not extend below the level of the previous point's positive noise. Constellations are then compressed and stored for retrieval during modulation, depending on the level of the echo. The constellation can be expanded or contracted at run-time by adding or subtracting a constant initial difference to the first difference value.

BRIEF DESCRIPTION OF THE DRAWINGS

Preferred embodiments of the invention are discussed hereinafter in reference to the drawings, in which.

DETAILED DESCRIPTION OF THE INVENTION

There is described herein a technique for equalizer designs and channel error detections for a PCM upstream data transmission between a digital PCM server modem and a PCM analog client modem.

Figure 1:
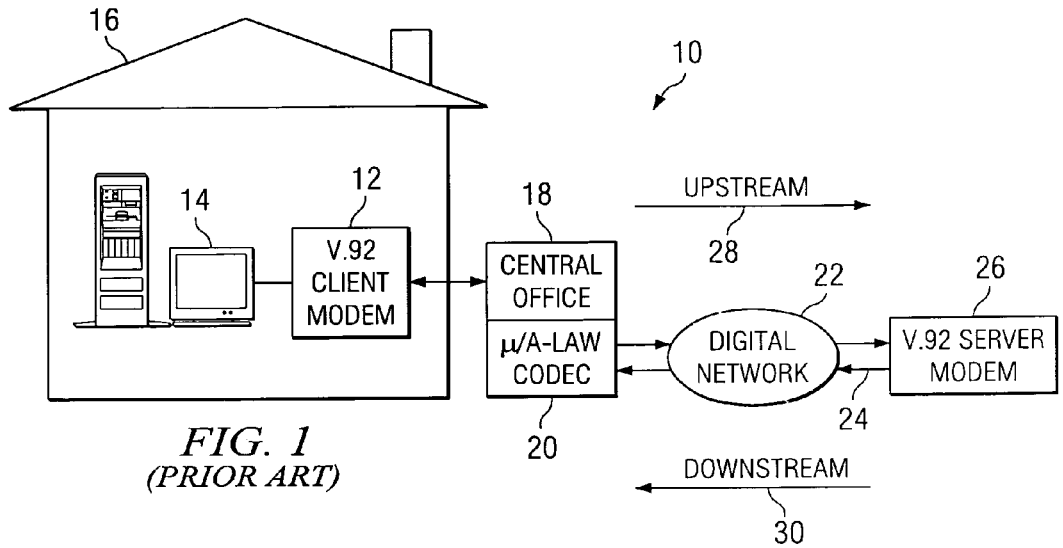
FIG. 1 is a diagram of a PCM a communications network.

When two modems connect over the public switched telephone network (PSTN), digital data from a central office (CO) often must be translated from digital signals at the server modem into analog tones for transmission over a local analog line to a client modem. At each client modem, the received analog waveform is sampled and quantized by an analog to digital convertor (A/D). A PCM upstream network with a voice-band modem connection is illustrated in FIG. 1. The network 10 includes a V.92 PCM client modem 12 from an end user's personal computer 14 connected to an analog telephone line 16, or channel. The analog channel 16 is connected to a telephone company central office (CO) 18 wherein the analog levels are quantized using a µ- or A-law codec 20. There is also a digital network 22 which is interconnected to the CO 18 and to the digital transmission channel, which may comprise a T1, E1, or ISDN line 24. A V.92 server modem 26 completes the connection in the upstream direction. Data may transmit in either the downstream direction (server to client modem) 28 or the upstream direction (client to server modem) 30.

For digital symbols transmitted over the analog channel to be reasonably free of intersymbol interference over the frequency spectrum used by the symbols, modems employ adaptive filters called equalizers. Equalization is a technique used to compensate for distortion in analog signal lines. One of the distortions which is compensated for is intersymbol interference. Equalizers in a receiver neutralize intersymbol interference which would cause high bit error rates if left uncompensated. Equalization is accomplished by passing the digital signal through a filter whose tap coefficients are adjusted so that the combination of channel plus equalizer is some known response. When the channel is properly equalized, data can be recovered reliably from the received symbols. Modems equalize the incoming signals by employing various types of equalizers include linear equalizers, decision-feedback equalizer, and trellis-based Viterbi equalizers. The equalizer taps of a minimum mean-square-error decision-feedback equalizer (MMSE-DFE) can be directly computed by Givens rotations without back-substitution and matrix-vector multiplication, as discussed in the paper "An Improved Fast Algorithm for Computing the MMSE Decision-Feedback Equalizer" by Bin Yang, Int. J. Electron. Commun., 51 (1999) No. 1, 1-8, which is incorporated herein by reference.

Figure 2:
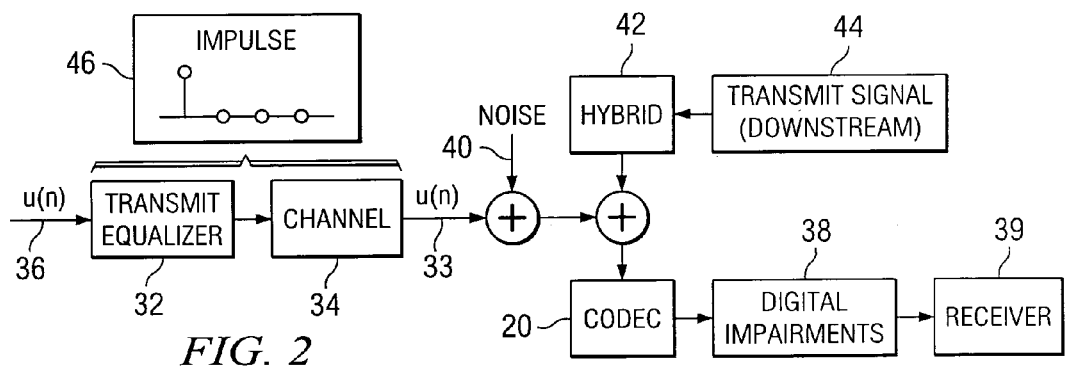
FIG. 2 is a diagram of a PCM upstream channel.

Referring to FIG. 2, there is illustrated in block diagram the effective PCM upstream channel 34. In this figure, the transmit equalizer 32 is designed to undo the negative effects of the channel so that the same signal, u(n), appears before and after the combination of the equalizer and channel 34. The input values, u(n) 36, are chosen from a constellation of points as determined by the server modem 26 (see section 6.4.2 in ITU-T/V.92). Because of the echo, the constellation of points will not correspond exactly to the PCM codec levels. However, it is still true, as in PCM downstream modulation, that there are more constellation points possible at smaller signal levels than at larger levels.

Digital impairments 38 include digital pads (digital gain) and robbed-bit-signaling (RBS). RBS is a technique used in T1 network connections where the least significant bit of each nth data octet is replaced with a control bit by the network for control signaling. For any one RBS link the frequency of robbed bits through a single T1 connection is one every sixth symbol. This "in-band" signaling is used to indicate things like "off-hook", "ringing", "busy signal", etc. RBS results in data impairment by changing transmitted bit values. RBS must be detected and the signaling bit ignored when present. Another problem with RBS in networks is where the link between two modems includes several different digital legs such that the number of RBS links is variable from one connection to another.

As mentioned previously, locking the upstream transmitter clock to the CO clock is more challenging than doing timing recovery in the downstream direction. A reasonable client modem implementation might use a phase-locked loop (PLL) for rough timing recovery and might use receive equalizer adaptation for finer timing recovery. Typically, the receiver equalizer updates react more quickly than does a PLL. An equalizer is used in the PCM upstream receiver of the present invention. However, the equalizer comes after the codec and can not prevent upstream timing drift from adding quantization noise. Finally, power line noise interference comes before the codec in PCM upstream. Cancellation after the codec will not eliminate the added quantization noise and will distort the received signal.

Figure 3:
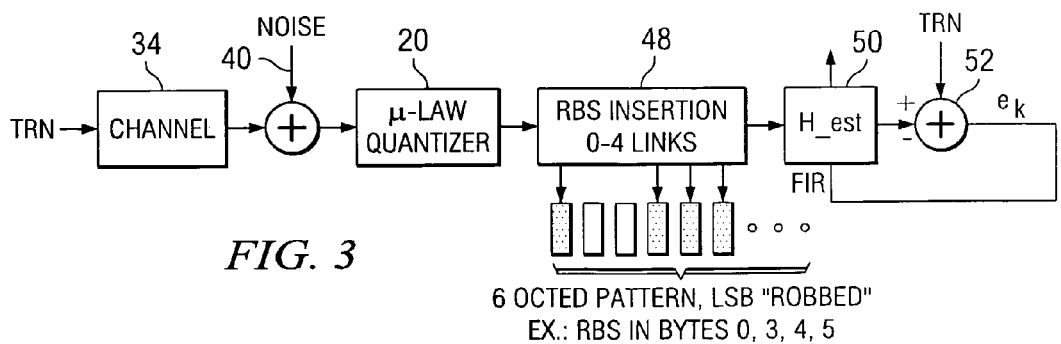
FIG. 3 is a PCM channel with robbed bit signaling.

To design the data mode upstream equalizer for PCM upstream, a channel identification is performed both during V.92 training events TRN1u and TRN2u. This provides adequate time for the channel to converge. An unbiased channel identification can be performed using least mean squares (LMS). The length of the channel is 96 samples, and the filters will converge in less than 2 seconds with LMS. FIG. 3 is a block diagram illustrating the LMS update setup. Once the estimate of the channel, H_est, has converged, the power of the error signal, $e_k$, should be close to the average power of the additive noise and quantization noise.

Robbed bit signaling (RBS) 48 is present is nearly all T1 connections but is not present in E1. In RBS, the least significant bit in every $6^{th}$ µ-law sample is replaced (or robbed) with signaling information. The signaling pattern is never longer than 4 bits long. Therefore, the pattern repeats every 24 µ-law samples. There can also be more than one RBS signaling channel. One channel might affect samples 0, 6, 12, 18 . . . while a second channel might affect samples 3, 9, 15, 21, . . . . The PN3857 test standard allows for up to four RBS links. RBS will also affect the constellation design in PCM upstream. When there is RBS, the space between adjacent µ-law samples effectively doubles. Therefore, the phase(s) containing RBS should be detected an tracked.

RBS detection in the upstream direction can be simplified since the µ-law samples are directly accessed. Over some period where any signal is being received, the least significant bit (LSB) from a block of 24 samples is stored. Then, these bits are compared to the subsequent block of 24 samples. The phases on which there is no RBS are expected to vary randomly between 1 and 0. On those samples with RBS, the same values are detected in every block, while the number of differences detected are tracked. If there is no RBS, the probability of k differences in n observations of the LSB is $$P = \binom{n}{k} \cdot .5^n$$

For 100 observations, the probability of fewer than eight (for example) observed bit differences is $\sim 10^{-19}$. RBS is detected if fewer than eight differences are observed on any of the 24 phases.

Once RBS is detected, samples with RBS can be adjusted to compensate for the average offset. This will affect the identified channel and the designed equalizer. The received samples can be adjusted by converting to a linear sample halfway between the RBS sample and the RBS sample with the RBS bit inverted. For example, if a sample known to have RBS inserted is received with value $\mu=50$, then the RBS bit was 0. The linear value corresponding to $\mu=50$ is $-3644$ and to $\mu=51$ is $-3516$. The linear sample should be set to the average of $-3580$.

Figure 4:
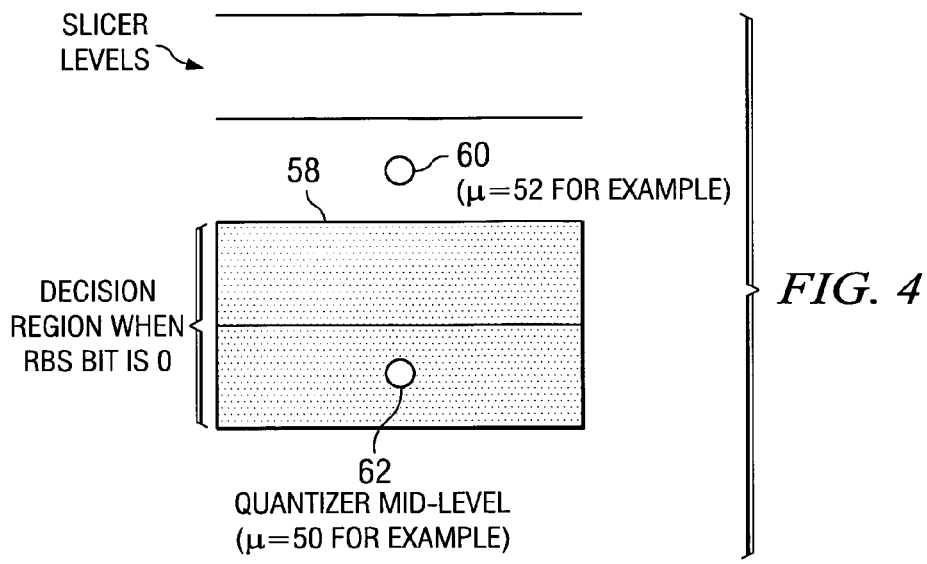
FIG. 4 is an example of quantization as modified by robbed bit signaling.

RBS will also affect the power of the error signal and the estimated channel. Referring to FIG. 4, the decision region is skewed when RBS is present The decision point 60 is not in the middle 62 of the decision region 58. For example, if the RBS bit is a 0, then positive samples will have an average positive offset caused by the RBS and negative samples will have an average negative offset. Assuming that the echo and additive noise are large enough to make the quantizer error nearly uniform, the extra noise power caused by the offset decision point is 2.4 dB.

After calculating the data mode equalizer, the upstream constellations are designed. There are generally two constellations, one for phases without RBS and one for phases with RBS. In the preferred embodiment, for a given codec type, the parameters in the run-time constellation design comprise the RBS and the power of the echo. The constellation is a compromise between performance and the probability that the channel noise and the client timing recovery are at a certain level. If there is more noise than was assumed or if the client does a poor job of timing recovery, the constellation can be expanded during a rate renegotiation.

The constellation for PCM upstream is the set of values that can be transmitted by the analog client modem according to V.92. After equalization, the effective channel can be thought of as channel in FIG. 2. The signal then encounters noise n(k) 40, that is added to the signal. The noise is the combination of the additive noise and any noise from intersymbol interference caused by imperfect equalization. The signal then enters a central office where it encounters codec and is quantized according to u-law (A-law in some countries outside the U.S.). The signal is submitted to an echo canceller that produces output digital signal u(k) with error e(k) in the signal. As the power of the pre-equalizer filter grows, the possible values of u(k) must be limited to stay within regulator power limits. However, as intersymbol interference grows, the receive signal becomes noisier and the spaces between constellation points must increase. The increase in spaces between constellation points has the negative effect of limiting the data rate.

The analog client modem 12 chooses u(k) from the constellation from an equivalence class defined by the user input data. To design a preferred constellation it is necessary to know the additive noise level, the phase of any RBS, the power and distribution of the echo, the type of codec ($\mu$-law or A-law), and any coding gain. However, only part of the required information is available. RBS and the power of the echo are identified and a known trellis code is used so that an estimation of the coding gain can be made, and the type of codec is known. The distribution of the echo is assumed not to widely vary. It is not possible to compute the level of additive noise which can include line/codec noise, timing drift and jitter in the client, and intersymbol interference caused by an inexact or changing channel or equalizers that are too short.

The PCM constellation design of the present invention is based upon a conservative estimate of the additive noise level. Higher or lower noise levels can only be accommodated through rate renegotiations. Constellations were designed off-line in the software application Matlab for a number of different echo levels, for the $\mu$-law without RBS, $\mu$-law with RBS, and the A-law. The additive noise level, coding gain, and target error rate are assumed fixed for all constellations. The constellations were then stored in a compressed format and reconstructed based on the measured echo.

The echo and codec affect the constellation design. Assuming the PCM upstream channel is modeled as in FIG. 2, the noise level is unknown, and the type of codec and the phase of any RBS are known, the effect on the constellation can be modeled. The $\mu$-law and A-law levels are broken up into 8 or 7 "chords" respectively. Tables I and II illustrate the positive linear values within each chord for the $\mu$-law and A-law. For both codecs, the negative linear values are equal in absolute value to the positive values. Each increase in a chord doubles the distance between codeword levels. For example, in the first chord in the $\mu$-law, there are 16 values. They are 0, 8, 16, 24, 32, 40, 48, 56, . . . 112, 120 as denoted by 0:8:120. The chord boundary is the midpoint between adjacent values between two chords. In the $\mu$-law, the linear value, 0, occurs twice, once in the positive values and once in the negative values.

TABLE I $\mu$-law Levels Within Each Chord

| Chord number | Linear interval | Chord boundary |
|---|---|---|
| 1 | 0:8:120 | 126 |
| 2 | 132:16:372 | 384 |
| 3 | 396:32:876 | 900 |
| 4 | 924:64:1884 | 1892 |
| 5 | 1980:128:3900 | 3996 |
| 6 | 4092:256:7932 | 8124 |
| 7 | 8316:512:15996 | 16380 |
| 8 | 16764:1024:32124 | |

TABLE II

A-law Levels Within Each Chord

| Chord number | Linear interval | Chord boundary |
|---|---|---|
| 1 | 8:16:504 | 516 |
| 2 | 528:32:1008 | 1032 |
| 3 | 1056:64:2016 | 2064 |
| 4 | 2112:128:4032 | 4128 |
| 5 | 4224:256:8064 | 8256 |
| 6 | 8448:512:16128 | 16512 |
| 7 | 16896:1024:32256 | |

If there was no echo, the Constellation points would be chosen to match certain codec levels or codec level boundaries to maintain a certain minimum distance between points. This distance would be based on a target error rate and an assumption about the noise level. The echo makes the design more difficult. When added to the received signal, the echo can move the received sample into a chord with a larger minimum distance between quantizer levels. Even with a perfect echo canceller, one that predicts the echo level exactly and subtracts it, the echo still changes the level of quantization noise.

Figure 5:
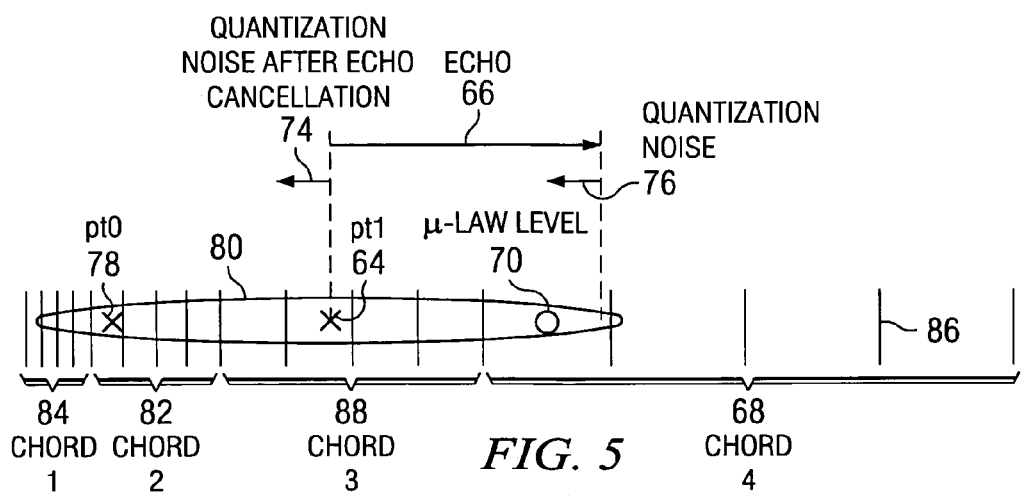
FIG. 5 is a diagram of quantization penalty caused by echo and quantization.

FIG. 5 is a diagram of how downstream echo creates quantization noise. Assume that the transmitted level, u(n), is pt1 64 and that there is no additive noise or intersymbol interference. The echo 66 is added to the transmitted point and pushes it into chord four (68) as shown. Then the received point is quantized to the nearest A/µ-law level as shown with a small circle 70. Even a perfect echo canceller can subtract the echo 66 but the received point 70 will still have the quantization noise 74 as shown.

The sphere of the echo 72, shown in FIG. 5, is the "likely" extent of the echo 66. The larger this sphere 72, the higher the quantization noise 76, the more space is needed between constellation points 64, 78 and the lower the data rate. In general, if the echo extends into a chord 68, 80-84 where the space between slicer levels 86 is $\Delta$, then the quantization noise will be uniform between $-\Delta/2$ and $+\Delta/2$.

The problem with designing a constellation online comes in determining the likely effect of the echo. If a constellation is designed by assuming that the quantization noise is dominated by the chord at the edge of the sphere of the echo, the constellation becomes overly conservative. However, all attempts to modify the design method to produce better constellations were unreliable.

The constellations were designed off-line in Matlab and stored for a number of different echo levels for the A-law, µ-law with no RBS, and µ-law with RBS cases. The design algorithms assume a certain target bit error rate (typically around 5e-4) and a certain noise level (usually around 28 dBm). This noise level should include the additive noise, timing jitter, and intersymbol interference, none of which can be precisely measured. It will be appreciated by one skilled in the art that it is possible to expand or contract the constellations at run-time in response to higher or lower than expected error rates. The constellation design assumes linear values from the values found in ITU recommendation V.90.

Figure 6:
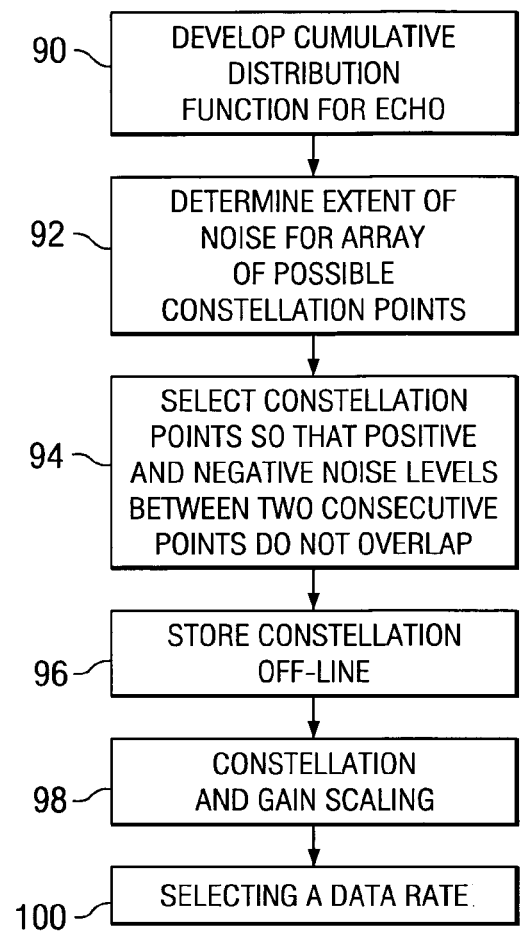
FIG. 6 a flowchart of the constellation design process.

General steps for constellation design are illustrated in the flow chart of FIG. 6. The first step 90 in the constellation design algorithm is to develop a cumulative distribution function (cdf) for the echo. Repeated tests have shown that the echo is not exactly Gaussian. The echo is the result of the PCM downstream signal filtered through a hybrid. The cumulative distribution of the echo was developed by running a simulation using a "typical" measured hybrid, scaled appropriately, and an actual V.90 downstream sequence. Other sources of noise are assumed to be Gaussian. No correlation between noise or echo samples was assumed, and they both have zero mean.

Next, the probability that the absolute echo is greater than some value, a, is denoted as p(|echo|>a) and similarly for the noise, p(|noise|>b). The p(|echo|>a) is derived from the simulated cdf and p(|noise|>b) is given by the complementary error function for Gaussian random variables for which there is no closed-form expression. Because of the independence of the echo and additive noise, the probability of the echo being greater than a and the noise being greater than b is given by the product, p(|echo|>a) p(|noise|>b).

The second step 92 of the constellation design is to determine the extent of the noise for an array of possible constellation points. First the target error rate, echo level, and Gaussian noise levels are selected. From this a number of possible values of a and b are developed such that p(|echo|>a) p(|noise|>b) is equal to the target error rate. For each possible value of a and b, an array of values are created for the echo and noise. Each of these possible values of echo and noise are added to the selected constellation point, the result quantized, the echo subtracted perfectly, and the worst cases of positive and negative noise tracked. This data is stored for each constellation point and used to design the constellation. Simulations were run for constellation points from 0 to 28000 in intervals of 4 for no RBS and 8 with RBS, but as one skilled in the art will recognize, the simulations are not limited to these parameters and any appropriate values can be used. Because of the large number of combinations: possible echo levels, values of a and b, possible echo and noise levels for each a and b, with and without RBS, and µ-law and A-law—this step of simulating constellation design can require intense computing resources.

Once these values are collected, the design is straightforward. The next point in the constellation 94 is selected so that it's largest negative noise does not extend below the level of the previous point's largest positive noise. This process is repeated until the value is greater than a determined value, for example greater than 28000. The constellation is always symmetric around zero. The first point in the algorithm is selected assuming that the previous point is simply the negative of the first point.

The next step 96 involves storing the constellation in a compressed format. This compression is done to save code memory. It is not used by the V.92 standard or shared between any two modems. To compress the constellation, some general characteristics are accounted for. Typically, the distance between constellation points constantly increases. Also, the distance between points is likely to be the same over the span of a few points. All values are stored to the nearest multiple of 4 for constellations with no RBS and the nearest multiple of 8 when there is RBS.

The compression method is as follows, beginning with the least significant bit: the first 8 bits in the constellation description give the length, in 16-bit words, of the complete description; the second 8 bit value is the first constellation point; the third 8 bit value is the distance between the first and second points; and all subsequent values are the differences between the distances between the points. These are 4-bit values from 0 to 13. If the value is greater than 13 or negative, a 15 is written followed by the 8-bit two's complement representation of the difference of the distance. If more than 2 identical values come in a row, the value 14 is written followed by a 4-bit number to denote the number of identical values. Using this method of compression, the average constellation length is about 13 words.

The constellation can be expanded or contracted at run-time by adding or subtracting a constant initial difference to the first difference value 98. This type of expansion will increase or decrease the distance between all points in the constellation by the same amount. This is appropriate if the noise level changes since it would affect all points equally. If the echo level changes, it is not appropriate to expand the constellation, but instead to select another of the stored constellations.

Following the constellation design is the selection of the data rate 100. The data rate is selected so that the transmit power during data mode is as close as possible to that during V.92 Phases III and IV. While there are no precise predictions of the transmit power, empirical estimations are within +/−1 dB. During data mode, the client can specify an increase or decrease transmit power by issuing a rate renegotiation. Once the constellation is designed, the data rate can be selected to be as high as possible without exceeding regulatory limits on transmit power. Practically, the V.92 standard says that the data rate should be selected so that the upstream transmit power matches the power in $TRN_{IU}$.

The first assumption is that the precoder output is wideband and flat. Therefore, the transmit power, $v_k$, is approximately the power of the precoder output, $x_k$, multiplied by the overall gain of the pre-equalizer filter. Simulation results show that this is a very good approximation.

Calculating the precoder output power, however, can be difficult because of the non-uniform constellation and the unknown distribution out of the precoder. However, the output can be approximated. Assume that the set of constellation points is specified by a(n) for $-N/2 \leq n < N/2$ and that a(0) is the smallest positive point and that a( ) is symmetric around zero. Assume also that M is the number of possible input data points per symbol. That is, each PAM symbol represents one of the points from 0 to M−1. If the constellation spacing were uniform, the precoder output would be approximately uniform and independent over the interval $a(M/2-1)+\Delta/2$ and $a(-M/2)-\Delta/2$ where $\Delta$ is the quantizer spacing. In this case, the power would be approximately the power of a uniform random variable which is $$\text{power}_{uniform-constellation} = (a(M/2-1)-a(-M/2)+\Delta)^2/12$$

Figure 7:
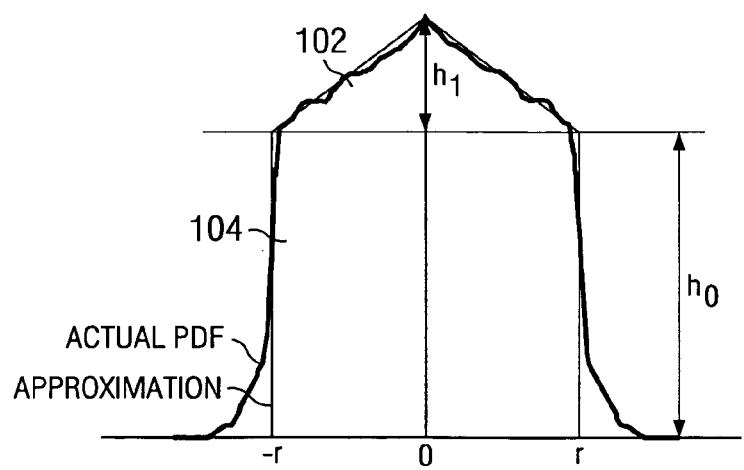
FIG. 7 is a graph of the approximate probability distribution function of the output of the precoder.

However, the constellation is non-uniform and the power estimate in the equation above is not very accurate. Depending on how the precoder filter affects the distribution, the actual distribution at the output of the precoder is closer to resembling a house-shape as shown in FIG. 7, which is an approximate probability distribution function of the output of the precoder. The variable r is defined as $a(M/2-1)+\Delta/2$ where $\Delta$ is the quantizer spacing at point $a(M/2-1)$. The distances $h_0$ and $h_1$ are set so that the triangular area 102 of height $h_1$ and the rectangular areas of widths r and −r 103, combined, are equal to 1. When $h_1=0$, this represents a uniform distribution.

Although it is not always true, $h_1$ tends to be larger (about equal to $h_0$) as the power of the precoder diminishes. This is because the distance between constellation points increases as the points get further from 0. With a large precoder, however, more randomness is introduced and the distribution tends to be closer to uniform. The probability distribution function that describes this house shape can be written $$f_x(x) = \frac{r-|x|}{r}h_1 + h_0 \text{ for } |x| < r, 0$$

otherwise the variance is equal to $$\frac{4h_0+h_1}{6}r^3$$

Because this represents a probability distribution function, the area must equal 1. This means that $$2rh_0 + rh_1 = 1$$

If $h_1 = \alpha h_0$, then the variance is $$r^2 \frac{\frac{(4+\alpha)}{(2+\alpha)}}{6}$$

It is assumed that the minimum value for $\alpha$ is 0 and that $\alpha$ is unlikely to exceed 1. $\alpha$ should be based on the distribution of the precoder output. As a first order approximation, $\alpha$ is set to 0 when the precoder energy is large and to near 1 when the energy is very small. A formula for the approximate power is $$\text{approximate power} = \left(\frac{\|b\|^2+5}{18}\right)r^2$$

where b is the finite length version of the precoder filter in a transmitter, not including the "1". If there were no precoder filter, $\|b\|=0$ and the power would be approximated at $5/18\ r^2$. This corresponds to $\alpha=1$. When the precoder filter $\|b\|=1$ which is fairly large, the approximate power is $r^2/3$ which corresponds to $\alpha=0$. Higher values for $\|b\|$ correspond to negative values for $\alpha$ which hold no intuitive meaning except to say that the power approximation will continue to increase as more emphasis is placed on the larger constellation points.

Observing over six different channels, this approximation always comes to within +/−1 dB of the actual transmit power. The V.92 standard stipulates that if the actual transmit power differs from the desired transmit power, the analog modem can notify the digital modem of the difference through a fast parameter exchange and the digital modem can then send a new value for M back to the analog modem to change the power. If the difference between the actual power and the approximate power is known, the new approximation based on the difference will be very accurate.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for selecting a data rate for a pulse code modulation (PCM) upstream transmission, comprising:
    determining a transmit power limit from a training event TRN1 u;
    determining an approximate transmit power before the upstream transmission reaches a transmit equalizer based on a precoder power output and a distance halfway between an outermost constellation point and a point following the outermost point, where the data rate is determined by the total number of points in the constellation and therefore of the outermost points in the constellation;
    determining a total transmit power on a line at an output of the transmit equalizer by multiplying the determined approximate transmit power before the transmit equalizer by the power gain of the transmit equalizer as commonly calculated as a norm squared of the equalizer taps; and
    selecting a data rate so that the total transmit power is less than the transmit power limit, power is a function of the number of possible input data points per symbol (M); the higher the symbol rate and more constellation points then the higher the data rate.

2. The method of claim 1, wherein:
    the determined approximate transmit power is defined as:

$$\left(\frac{x\|b\|^2+y}{z}\right)r^2$$

where x, y, and z are pre-determined constants, and wherein b is a precoder filter not including the "1"; and r is defined as $a(M/2-1) +\Delta 2$ wherein a() is a set of constellation points, M is the number of possible input data points per symbol, and $\Delta$ is the quantizer spacing at point $a(M/2-1)$.

3. The method of claim 2, wherein: the constants are set as x=1, y=5, and z=18.

* * * * *